United States Patent [19]

Jetter

[11] Patent Number: 4,836,036

[45] Date of Patent: Jun. 6, 1989

[54] BENDING FORCE RECEIVER, IN PARTICULAR, FOR BALANCES

[75] Inventor: Hans Jetter, Balingen-Engstlatt, Fed. Rep. of Germany

[73] Assignee: Bizerba-Werke Wilhelm Kraut GmbH & Co. KG, Fed. Rep. of Germany

[21] Appl. No.: 147,886

[22] Filed: Jan. 25, 1988

[30] Foreign Application Priority Data

Jan. 27, 1987 [DE] Fed. Rep. of Germany ....... 3702271

[51] Int. Cl.$^4$ .......................... G01L 1/22; G01G 3/08
[52] U.S. Cl. .................. 73/862.65; 177/211; 177/229
[58] Field of Search ............ 73/862.65; 177/211, 177/229; 338/5

[56] References Cited

U.S. PATENT DOCUMENTS

| | | | |
|---|---|---|---|
| 3,577,779 | 5/1971 | Laimins | 73/862.65 |
| 4,542,800 | 9/1985 | Knothe et al. | 177/229 X |
| 4,633,721 | 1/1987 | Nishiyama | 73/862.65 X |
| 4,655,305 | 4/1987 | Jacobson | 73/862.65 X |

Primary Examiner—Charles A. Ruehl
Attorney, Agent, or Firm—Kramer, Brufsky & Cifelli

[57] ABSTRACT

A bending force receiver, in particular, for balances, comprises two parallelogram links which can be subjected to a load-dependent bending force, strain gauge strips which are arranged on the links and are interconnected to form an electric bridge circuit for delivering load-dependent measurement signals, and a load plate which is arranged on the bending force receiver for accommodating the load which is to be measured. At least one opening is formed on one of the parallelogram links. All of the strain gauge strips of the bridge circuit are arranged as closely as possible to this opening on only the outer side of the link comprising the opening.

6 Claims, 1 Drawing Sheet

BENDING FORCE RECEIVER, IN PARTICULAR, FOR BALANCES

The invention relates to a bending force receiver, in particular, for balances, with two parallelogram links which can be subjected to a load-dependent bending force, with strain gauge strips which are arranged on these links and which are interconnected to form an electric bridge circuit for delivering load-dependent measurement signals, and with a load plate which is arranged on the bending force receiver for accommodating the load which is to be measured.

In a known bending force receiver of this kind (German Pat. No. 1,206,622) embodying both the function of a readjusting spring element and that of a mechanical parallel guide systems, the load plate can be connected directly or by means of a rearward cantilever arm to the bending force receiver when employed as a so-called weighing unit in a balance. For manufacturing reasons, it would be expedient to arrange the strain gauge strips on only the outer side of one of the two parallelogram links. Without additional structural measures, this would, however, result in linearity errors which falsify the measurement result.

In principle, a bending force receiver of the kind in question acts like a parallelogram guide system and consists of two bending bars which form the two parallelogram links and are joined together at their ends by rigid end sections. It is also possible for the bending force receiver to be worked in one piece from a single block of material. Depending on how the load plate is arranged on the bending force receiver—either by direct attachment to the force receiver or by interposition of a rearward cantilever arm—or also depending upon the positioning of a load on the load plate, the line of application of the force caused by the load does, in general, not lie at the center of the two parallelogram links. The stress conditions produced in each of these links by the force of the load are, therefore, not symmetrical with respect to the center of the links acting as bending bars. Accordingly, if four strain gauge strips were arranged on only one link, a bridge voltage which is non-linear in an undesired manner would result.

It is known to avoid the linearity error caused by this asymmetry of the introduction of the force by interconnecting two of the four strain gauge strips, in each case, to form a half bridge and arranging one of these half bridges on each parallelogram link. In this way, the strain gauge strips of each half bridge by itself are subjected to symmetrical stresses, and the output signal of the full bridge consisting of the two half bridges is not affected by a linearity error, but the arrangement of two strain gauge strips on each parallelogram link, in each case, involves a great deal of manufacturing expenditure.

It is, furthermore, known (EP-OS No. 153,121) to construct the parallelogram guide system not with two but with three parallel bending bars in order to linearize the bending force receivers under consideration. In this way, even if the load is off-center, the stress conditions in the center bending bar are symmetrical, and a full bridge circuit arranged there exhibits linear behavior. However, such a bending force receiver design similarly requires a high degree of manufacturing expenditure, in particular, because of the difficulty in accessibility for mounting and wiring purposes.

A further drawback of the first above-mentioned case in which the strain gauge strips are arranged on both parallelogram links is a higher degree of wiring expenditure because wirings have to be provided to both parallelogram links.

The object underlying the invention is to so design a generic bending force receiver that its strain gauge strips are arranged on only one of the parallelogram links, yet no inadmissible linearity errors occur.

The object is achieved, in accordance with the invention, in that at least one opening is formed on one of the parallelogram links, and all of the strain gauge strips of the bridge circuit are arranged as closely as possible to this opening on the outer side only of the link comprising the opening.

The distribution of stress in the parallelogram link is altered in such a way by the above-mentioned opening, in comparison with a bending bar in the form of a solid plate, that with the strain gauge strips arranged in the proximity of the opening, asymmetrical conditions and hence considerable linearity errors are avoided.

The following description of preferred embodiments serves in conjunction with the appended drawings to explain the invention in greater detail. In the drawings.

Figure 1:
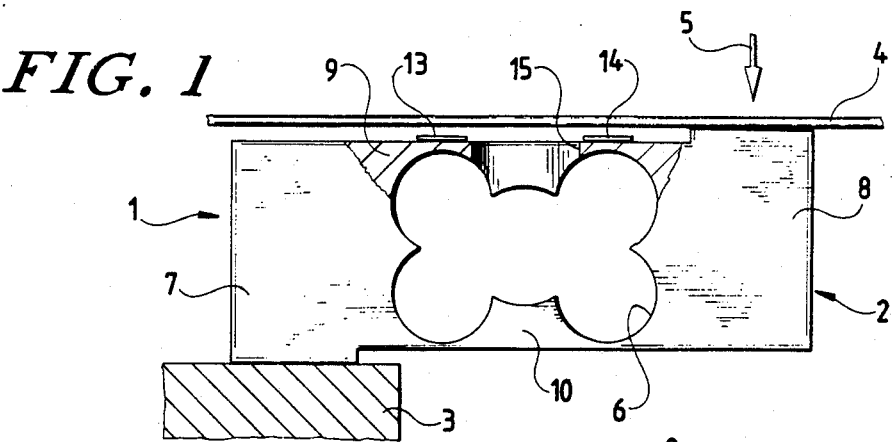
FIG. 1 is a partly broken-open side view of a bending force receiver designed as a parallelogram guide system with a load plate.
Figure 2:
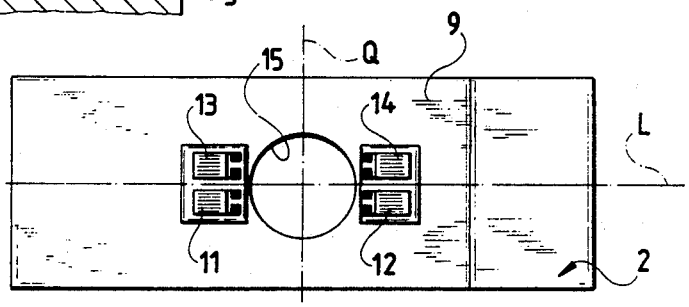
FIG. 2 is a partial plan view of the bending force receiver shown in FIG. 1.

The bending force receiver 1 illustrated in FIGS. 1 and 2 comprises a block 2 of solid material consisting, for example, of metal, which is connected at the bottom left to a stationary base, for example, the frame 3 of a balance, and at the top right supports a load plate 4 which is directly connected to it and extends horizontally over the top side of the block 2. Arrow 5 represents the line of application of a force which corresponds to a load placed on the load plate 4. Parallel to the load plate 4 which extends in a horizontal plane, the block 2 of material comprises a continuous cut-out section 6 which is formed in the manner apparent from FIG. 1 by a total of five continuous single bores.

The block 2 is divided by the cut-out section 6 into two solid end sections 7, 8 which are articulatedly connected to each other by relatively thin "parallelogram links" 9, 10. Hence when subjected to load, the end section 8 can move parallel to the end section 7, in which case the parallelogram links 9, 10 are correspondingly bent.

The load-dependent bending forces are transferred to a total of four strain gauge strips 11, 12, 13 and 14 which are interconnected by corresponding (not illustrated) wirings, in a known manner, to form a bridge circuit. As illustrated, these strain gauge strips are arranged solely on the outer top side of the bending force receiver 1. They can, therefore, be mounted without significant additional manufacturing expenditure.

Between the four strain gauge strips 11, 12, 13, 14, the parallelogram link 9 supporting these strain gauge strips comprises an opening 15 in the form of a bore which extends as far as the cut-out section 6. The strain gauge strips 11, 12, 13 and 14 lie as close as possible to the edge of this opening 15. It was found that on account of this opening 15, the four strain gauge strips in the parallelogram link 9 are, independently of the arrangement of the load to be measured on the load plate 4, only subjected to such bending stresses when a load is applied to the bending force receiver 1 that the linearity errors lie within the admissible error limits. Accordingly, provision of this opening 15 enables all of the strain gauge strips 11, 12, 13, 14 to be arranged on the outer side of the parallelogram link 9 at the top in FIG. 1. The strain gauge strips can, for example, be previously wired and embedded in a foil which is then secured to the parallelogram link 9 in a relatively simple operation.

In FIG. 2, the longitudinal axis of the parallelogram link 9 is designated L, whereas the transverse axis is designated Q. The entire assembly consisting of the strain gauge strips 11, 12, 13, 14 and the opening 15 is arranged at the center of the parallelogram link 9 and symmetrically with the midpoint of the link, in which case the midpoint is predetermined by the point of intersection of the axes L and Q.

In the embodiment shown in FIGS. 1 and 2, the strain gauge strips 11, 12, 13, 14 and the opening 15 are arranged on the top side of the top parallelogram link 9. A corresponding arrangement solely on the underside of the bottom parallelogram link 10 is similarly possible.

As is further apparent from FIG. 1, the strain gauge strips 13, 14 (and in a corresponding manner 11, 12) are arranged at the points of articulation of the parallelogram links 9, 10, i.e., where the block 2 of material is thinnest on account of the cut-out section 6. The greatest bending occurs at these connection or articulation points.

Figure 3:
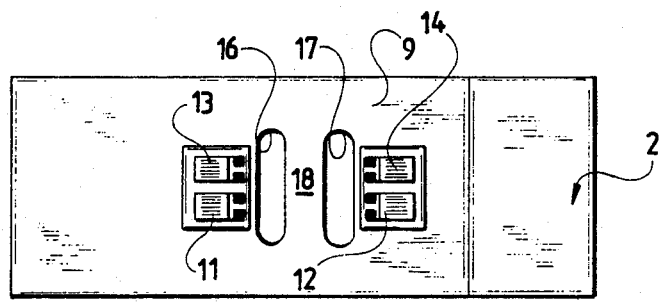
FIGS. 3 and 4 are views similar to FIG. 2 of other embodiments of bending force receivers.

In the embodiment shown in FIG. 3, two openings 16, 17 penetrating the parallelogram link 9 in the form of two elongate holes, with a web 18 of solid material located between them, are provided instead of the single circular opening 15 (FIG. 2). This design has the advantage that contacting elements (not illustrated) required for the circuit or balancing and compensating resistors for the bridge circuit can be arranged on the web 18. The elongate holes 16, 17 are parallel to each other.

Figure 4:
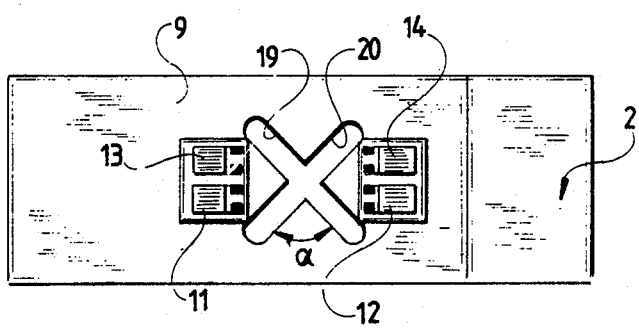

In the embodiment shown in FIG. 4, intersecting elongate holes 19, 20 are provided between the strain gauge strips 11, 12, 13 and 14 as opening, with the angle of intersection α between the elongate holes 19, 20 being between approximately 60 and 90 degrees.

With the opening configuration shown in FIGS. 3 and 4, similarly advantageous effects are also obtained with respect to distribution of the bending stresses as in the embodiment shown in FIG. 2.

In the illustrated embodiment, a total of four strain gauge strips are provided, in each case. In other embodiments, it may be sufficient for only two such strain gauge strips to be arranged on the one parallelogram link provided with the opening. In this case, the other two strain gauge strips must be replaced by electric resistors in the electric bridge circuit.

What is claimed is:

1. A bending force receiver, in particular, for balances, with two parallelogram links (9, 10) which can be subjected to a load-dependent bending force (5) by means of a load plate (4), and with strain gauge strips (11, 12, 13, 14) which are arranged on one essentially rectangular outer side of one of these links which are interconnected to form an electric bridge circuit for delivering load-dependent measurement signals, the outer side of the one parallelogram link being equipped with the strain gauge strips comprises a midpoint which is predetermined by the point of intersection of one longitudinal axis (L) and one transverse axis (Q) of this side, characterized in that at least one opening (15; 16, 17; 19, 20) between the strain gauge strips is formed on the parallelogram link supporting the strain gauge strips (11, 12, 13, 14), that all strain gauge strips (11, 12, 13, 14) are arranged as closely as possible to the at least one opening and symmetrically to the midpoint of the outer side on this side, and that the strain gauge strips (11, 12, 13, 14) are arranged facing the direction of the longitudinal axis (L) before and behind the at least one opening (15; 16, 17; 19, 20).

2. A bending force receiver as defined in claim 1, characterized in that the at least one opening (15) is circular.

3. A bending force receiver as defined in claim 1, characterized in that the at least one opening includes two elongate holes (16, 17) extending transversely to the longitudinal axis (L) of the link (9, 10).

4. A bending force receiver as defined in claim 1, characterized in that the at least one opening includes two elongate holes (19, 20) intersecting at an angle α of 60 to 90 degrees.

5. A bending force receiver as defined in claim 1, characterized in that the strain gauge strips (11, 12, 13, 14) are arranged above articulation points of the parallelograms links (9, 10).

6. A bending force receiver as defined in claim 1, characterized in that it comprises a main body with two end sections (7, 8), said two parallelogram links (9, 10) and a cut-out section (6) separating the parallelogram links and the end sections from one another, and in that it is made in one piece from one single block (2) of material.

* * * * *